United States Patent
Osuga et al.

(10) Patent No.: US 10,622,906 B2
(45) Date of Patent: Apr. 14, 2020

(54) POWER CONVERSION APPARATUS AND ELECTRIC PROPULSION SYSTEM

(71) Applicant: Mitsubishi Electric Corporation, Chiyoda-ku (JP)

(72) Inventors: Hiroyuki Osuga, Chiyoda-ku (JP); Takayuki Hidaka, Chiyoda-ku (JP); Takashi Miyamoto, Chiyoda-ku (JP); Tomokazu Sakashita, Chiyoda-ku (JP); Satoshi Ojika, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/347,346

(22) PCT Filed: Dec. 19, 2016

(86) PCT No.: PCT/JP2016/087786
§ 371 (c)(1),
(2) Date: May 3, 2019

(87) PCT Pub. No.: WO2018/116349
PCT Pub. Date: Jun. 28, 2018

(65) Prior Publication Data
US 2019/0288605 A1     Sep. 19, 2019

(51) Int. Cl.
*H02M 1/32* (2007.01)
*H02M 3/335* (2006.01)
(Continued)

(52) U.S. Cl.
CPC ......... *H02M 3/33576* (2013.01); *H02M 1/32* (2013.01); *H02M 3/28* (2013.01);
(Continued)

(58) Field of Classification Search
CPC . H02M 2001/0077; H02M 2001/0083; H02M 2001/008; H02M 2001/0093;
(Continued)

(56) References Cited

U.S. PATENT DOCUMENTS 3,818,307 A * 6/1974 Hamilton .................. G05F 1/44
363/25
5,546,299 A * 8/1996 Lenz .................. G01R 33/3852
363/65

(Continued)

FOREIGN PATENT DOCUMENTS

JP    2001-309557 A    11/2001
JP    2003-111414 A    4/2003
(Continued)

OTHER PUBLICATIONS

International Search Report dated Feb. 21, 2017 in PCT/JP2016/087786 filed Dec. 19, 2016.
(Continued)

*Primary Examiner* — Gary L Laxton
(74) *Attorney, Agent, or Firm* — Oblon, McClelland, Maier & Neustadt, L.L.P.

(57) ABSTRACT

A power conversion apparatus (10) includes a plurality of power conversion units (12) each having a function of converting an input direct current voltage to a different direct current voltage, and a control unit (15) that controls the plurality of power conversion units (12) in accordance with a target value Vaim for the sum of voltages output from the plurality of power conversion units (12). When making one or more of the power conversion units (12) output a first voltage which is fixed and making a different one of the power conversion units (12) output a second voltage which is adjusted in accordance with the target value Vaim, the control unit (15) repeatedly switches a power conversion
(Continued)

unit (12) to output the second voltage at least between two of the power conversion units (12).

16 Claims, 14 Drawing Sheets

(51) Int. Cl.
*H02M 3/28* (2006.01)
*H02M 3/22* (2006.01)
*H02M 1/00* (2006.01)

(52) U.S. Cl.
CPC ............ *H02M 2001/0003* (2013.01); *H02M 2001/0074* (2013.01); *H02M 2001/327* (2013.01)

(58) Field of Classification Search
CPC .......... H02M 3/33561; H02J 3/38; H02J 3/46; H02J 2001/008
See application file for complete search history.

(56) References Cited

U.S. PATENT DOCUMENTS

| | | | |
|---|---|---|---|
| 5,969,512 A * | 10/1999 | Matsuyama | H02M 3/158 307/130 |
| 6,154,383 A | 11/2000 | Cardwell, Jr. | |
| 6,574,125 B2 | 6/2003 | Matsukawa et al. | |
| 7,760,517 B2 | 7/2010 | Herty et al. | |
| 2002/0126517 A1 | 9/2002 | Matsukawa et al. | |
| 2006/0273770 A1 | 12/2006 | Siri | |
| 2008/0259645 A1 | 10/2008 | Herty et al. | |
| 2015/0109828 A1 | 4/2015 | Koo et al. | |
| 2015/0303815 A1 | 10/2015 | Chen et al. | |

FOREIGN PATENT DOCUMENTS

| | | |
|---|---|---|
| JP | 2008-245516 A | 10/2008 |
| JP | 2012-217319 A | 11/2012 |
| JP | 2013-223328 A | 10/2013 |
| JP | 5311857 B2 | 10/2013 |

OTHER PUBLICATIONS

Boss, M. et al., "Generic High Voltage Power Module for Electrical Propulsion," The 29th International Electric Propulsion Conference, Oct. 31-Nov. 4, 2005, IEPC-2005-278, pp. 1-9.

Gollor, M. et al., "Electric Propulsion Electronics Activities in Astrium Germany," The 30th International Electric Propulsion Conference, Sep. 17-20, 2017, IEPC-2007-20, pp. 1-9.

European Search Report dated Nov. 6, 2019 in European Application No. 16924510.7, 11 pages.

Lian Yiqing et al: "Modular input-parallel output-series DC/DC converter control with fault detection and redundancy", IET Generation , Transmission & Distribution, IET, UK , vol. 10, No. 6, Apr. 21, 2016 (Apr. 21, 2016) pp. 1361-1369, XP006056415, 9 pages.

* cited by examiner

POWER CONVERSION APPARATUS AND ELECTRIC PROPULSION SYSTEM

TECHNICAL FIELD

The present invention relates to a power conversion apparatus and an electric propulsion system.

BACKGROUND ART

A DC/DC converter is a circuit that converts a direct current voltage input from a direct current voltage source to a different direct current voltage. "DC" is an abbreviation for Direct Current. The DC/DC converter is roughly divided into three types: a step-up DC/DC converter, a step-down DC/DC converter, and a step-up/step-down DC/DC converter. The step-up DC/DC converter is a circuit that converts an input direct current voltage to a larger direct current voltage. The step-down DC/DC converter is a circuit that converts an input direct current voltage to a smaller direct current voltage. The step-up/step-down DC/DC converter is a circuit that is capable of both conversion to a direct current voltage larger than an input direct current voltage and conversion to a direct current voltage smaller than an input direct current voltage.

Typically, the step-up DC/DC converter boosts an input direct current voltage using a turns ratio of a transformer. In the step-up DC/DC converter with a large ratio of output to input, the turns ratio of the transformer is large, resulting in poor conversion efficiency.

Non-Patent Literature 1 discloses a DC/DC converter configured by connecting a plurality of power conversion circuits in series as a power conversion apparatus for an electric propulsion device such as an ion engine. In this DC/DC converter, in addition to a series-resonant power conversion circuit with a fixed output voltage to achieve high conversion efficiency, a different power conversion circuit with a variable output voltage is provided. The overall output voltage is adjusted by adjusting the output voltage of this different power conversion circuit.

Non-Patent Literature 2 discloses a DC/DC converter configured by connecting a plurality of power conversion circuits in parallel as a power conversion apparatus for an electric propulsion device. In this DC/DC converter, one of the power conversion circuits operates as a master and the rest of the power conversion circuits operate as slaves. The overall output voltage is adjusted by adjusting the output voltage of the master while the output voltages of the slaves are fixed.

CITATION LIST

Non-Patent Literature

Non-Patent Literature 1: M. Gollor, M. Boss, "Electric Propulsion Electronics Activities in Astrium Germany", The 30th International Electric Propulsion Conference, Sep. 17-20, 2007, IEPC-2007-20

Non-Patent Literature 2: M. Boss et al., "Generic High Voltage Power Module for Electrical Propulsion", The 29th International Electric Propulsion Conference, Oct. 31-Nov. 4, 2005, IEPC-2005-278

SUMMARY OF INVENTION

Technical Problem

In the power conversion apparatuses disclosed in Non-Patent Literature 1 and Non-Patent Literature 2, the conversion efficiency of a power conversion circuit whose output voltage is adjusted may deteriorate and a large rise in temperature due to power loss may occur in a heat-generating component of this power conversion circuit. That is, there is a risk of a hot spot occurring in the conventional power conversion apparatus. Since a hot spot may cause component failure or performance deterioration, a large radiator needs to be provided in the power conversion apparatus as a countermeasure. Therefore, a problem of the conventional technology is that the size of the power conversion apparatus is increased.

It is an object of the present invention to prevent a hot spot from occurring in a power conversion apparatus.

Solution to Problem

A power conversion apparatus according to one aspect of the present invention includes:

a plurality of power conversion units each having a function of converting an input direct current voltage to a different direct current voltage; and a control unit to control the plurality of power conversion units in accordance with a target value for a sum of voltages output from the plurality of power conversion units, and when making one or more of the plurality of power conversion units output a first voltage which is fixed and making a different one of the plurality of power conversion units output a second voltage which is adjusted in accordance with the target value, to repeatedly switch a power conversion unit to output the second voltage at least between two of the plurality of power conversion units.

Advantageous Effects of Invention

In the present invention, a power conversion unit whose output voltage is adjusted is switched repeatedly. Thus, heat generation can be dispersed. As a result, a hot spot is unlikely to occur in a power conversion apparatus.

DESCRIPTION OF EMBODIMENTS

Figure 1:
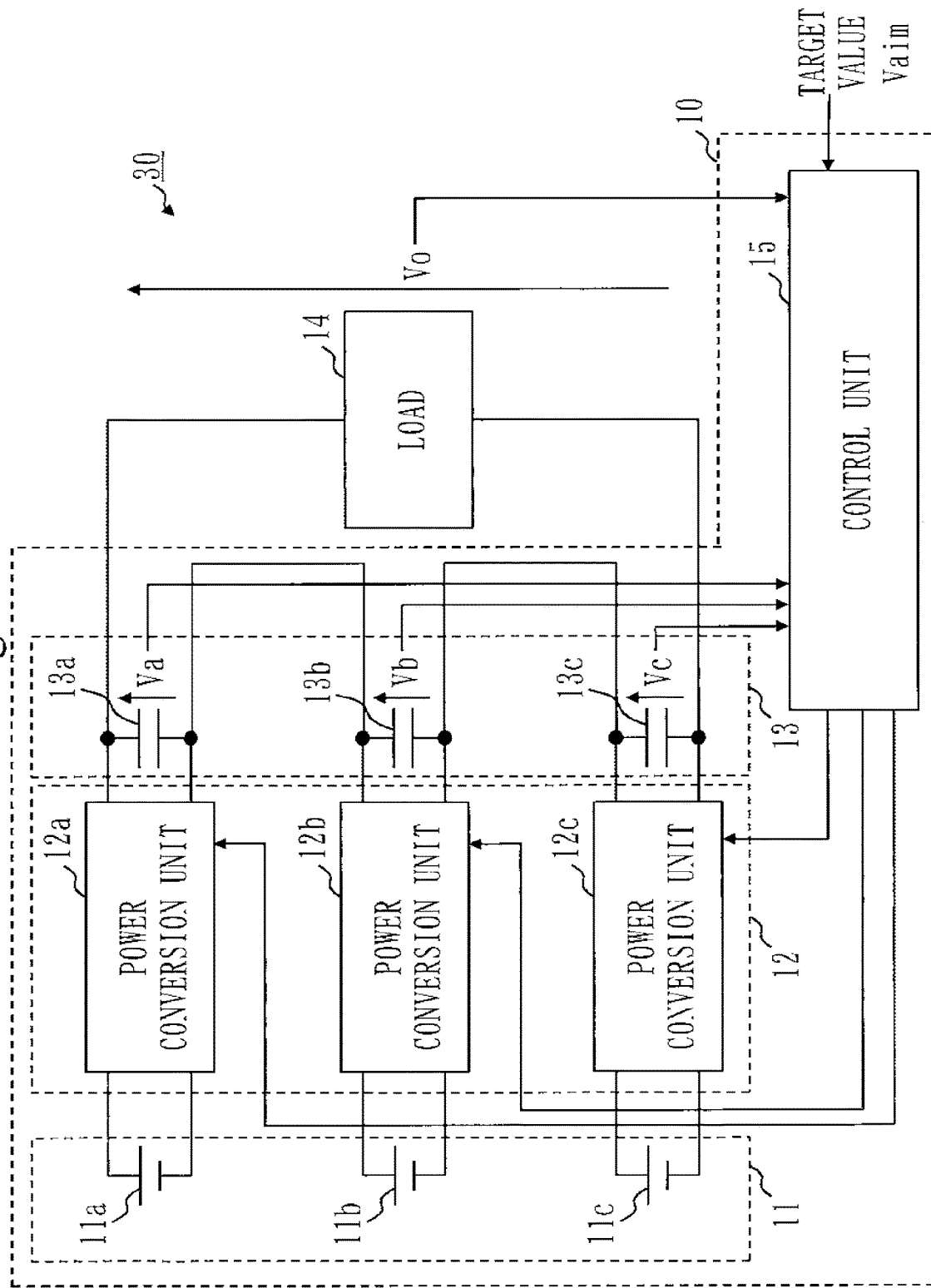
FIG. 1 is a circuit block diagram illustrating a configuration of an electric propulsion system according to a first embodiment.

Embodiments of the present invention will be described hereinafter with reference to the drawings. Throughout the drawings, the same or corresponding parts are denoted by the same reference numerals. In the description of the embodiments, description of the same or corresponding parts will be omitted or simplified as appropriate. Note that the present invention is not limited to the embodiments to be described hereinafter, and various modifications are possible as necessary. For example, a plurality of embodiments of the embodiments to be described hereinafter may be implemented in combination. Alternatively, one embodiment or a combination of a plurality of embodiments of the embodiments to be described hereinafter may be partially implemented.

First Embodiment

This embodiment will be described with reference to FIG. 1 to FIG. 9.

*Description of Configuration*

A configuration of an electric propulsion system 30 according to this embodiment will be described with reference to FIG. 1.

In this embodiment, the electric propulsion system 30 is a Hall thruster. However, the electric propulsion system 30 may be other types of electric propulsion devices for space such as an ion engine, or other types of electric-propulsion-type mobile bodies such as an electric propulsion vehicle or an electric propulsion ship.

The electric propulsion system 30 includes a power conversion apparatus 10 and a load 14.

The power conversion apparatus 10 includes a plurality of power conversion units 12 each having a function of converting an input direct current voltage to a different direct current voltage, and a control unit 15 that controls the plurality of power conversion units 12 in accordance with a target value Vaim for the sum of voltages output from the plurality of power conversion units 12. The "different direct current voltage" means a direct current voltage larger than the input direct current voltage or a direct current voltage smaller than the input direct current voltage.

In this embodiment, the power conversion apparatus 10 includes three of the power conversion units 12. Specifically, the power conversion apparatus 10 includes a power conversion unit 12a, a power conversion unit 12b, and a power conversion unit 12c. Note that the number of the power conversion units 12 is not limited to three and may be two, or may be four or more.

The load 14 may be any element and is an anode of the Hall thruster in this embodiment. The voltages output from the plurality of the power conversion units 12 are applied to the load 14.

In this embodiment, the power conversion apparatus 10 further includes the same number of direct current voltage sources 11 as the number of the power conversion units 12 and the same number of capacitors 13 as the number of the power conversion units 12. Specifically, the power conversion apparatus 10 includes a direct current voltage source 11a, a direct current voltage source 11b, a direct current voltage source 11c, a capacitor 13a, a capacitor 13b, and a capacitor 13c.

In the configuration illustrated in FIG. 1, the power conversion unit 12a that converts a direct current voltage input from the direct current voltage source 11a to a different direct current voltage Va is connected in parallel with the capacitor 13a that smoothes an output voltage Va of the power conversion unit 12a. Similarly, the power conversion unit 12b that converts a direct current voltage input from the direct current voltage source 11b to a different direct current voltage Vb is connected in parallel with the capacitor 13b that smoothes an output voltage Vb of the power conversion unit 12b. Similarly, the power conversion unit 12c that converts a direct current voltage input from the direct current voltage source 11c to a different direct current voltage Vc is connected in parallel with the capacitor 13c that smoothes an output voltage Vc of the power conversion unit 12c. A parallel circuit of the power conversion unit 12a and the capacitor 13a, a parallel circuit of the power conversion unit 12b and the capacitor 13b, and a parallel circuit of the power conversion unit 12c and the capacitor 13c are connected in series to constitute a series circuit. Power is supplied to the load 14 from this series circuit. A load voltage Vo which is a voltage applied to the load 14 is the sum of the output voltage Va of the power conversion unit 12a, the output voltage Vb of the power conversion unit 12b, and the output voltage Vc of the power conversion unit 12c.

Figure 2:
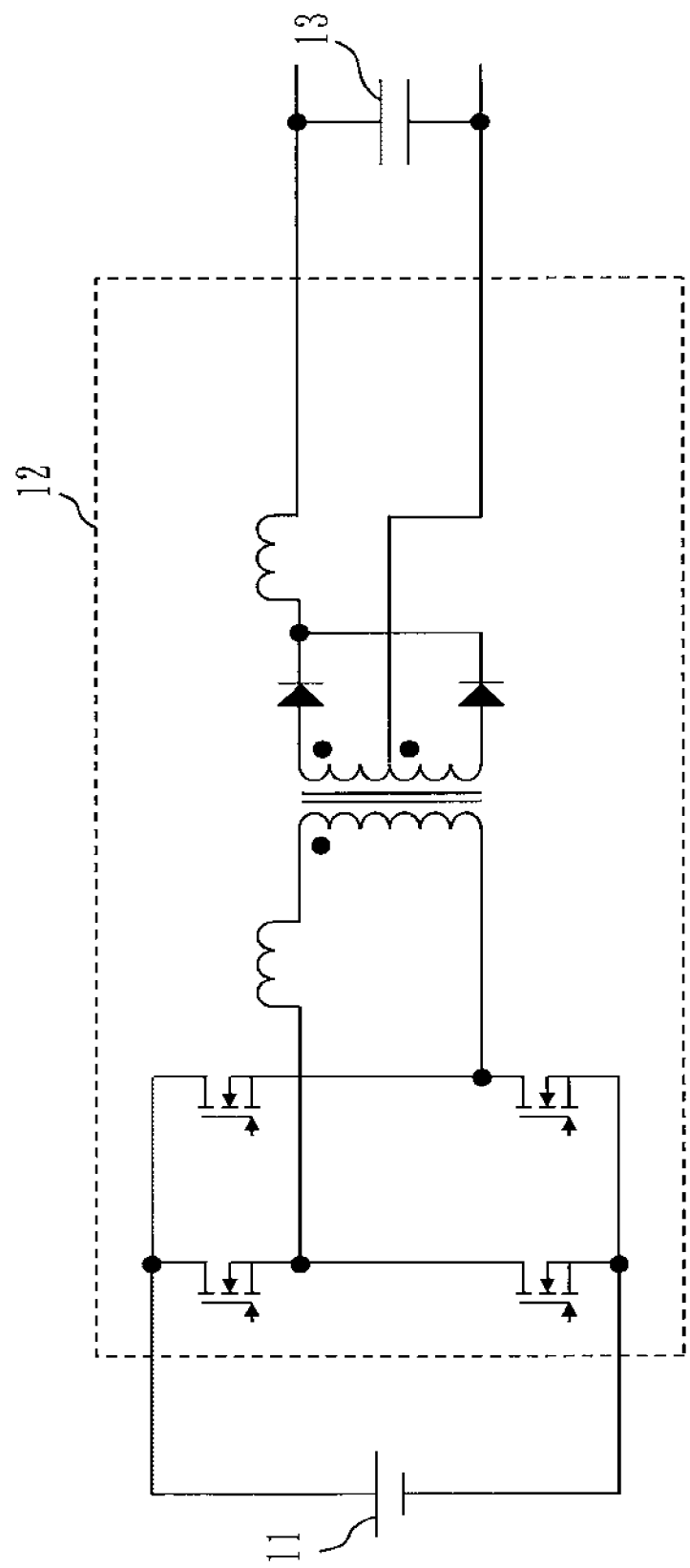
FIG. 2 is a diagram illustrating an example configuration of each power conversion unit of a power conversion apparatus according to the first embodiment.

In this embodiment, the individual power conversion units 12 are switching-type converters with pulse width control. Specifically, each of the power conversion units 12 is a full-bridge converter as illustrated in FIG. 2. Note that each of the power conversion units 12 may be a half-bridge converter, a push-pull converter, a forward converter, a flyback converter, a buck-boost converter, a resonant converter, or an active-clamp converter.

In order to simplify design, all three combinations of the direct current voltage source 11, the power conversion unit 12, and the capacitor 13 are implemented with the same circuit configuration and the same circuit components. Note that the capacitor 13 may be included in the power conversion unit 12.

The control unit 15 is a digital control IC such as a microcomputer or an FPGA. "FPGA" is an abbreviation for Field-Programmable Gate Array. "IC" is an abbreviation for Integrated Circuit. The control unit 15 has functions of detecting the load voltage Vo and the output voltages of the individual power conversion units 12 via voltage divider resistors (not illustrated) or the like, and outputting PWM signals for controlling the output voltages of the individual power conversion units 12 to the individual power conversion units 12 so that the load voltage Vo becomes the target value Vaim. "PWM" is an abbreviation for Pulse Width Modulation. Note that the control unit 15 may be any element that can achieve the functions as described above and is not limited to a digital control IC.

A configuration of the control unit 15 will be described with reference to FIG. 3.

The control unit 15 includes, as functional elements, a division unit 20, a protection unit 21, an adder 22a, an adder 22b, an adder 22c, a calculation unit 23a, a calculation unit 23b, and a calculation unit 23c. The operation of these functional elements will be described later.

*Description of Operation*

The operation of the power conversion apparatus 10 according to this embodiment will be described with reference to FIG. 1 and FIG. 3. The operation of the power conversion apparatus 10 corresponds to a power conversion method according to this embodiment.

In this embodiment, as illustrated in FIG. 1, three circuits including the power conversion unit 12a, the power conversion unit 12b, and the power conversion unit 12c, respectively, are connected in series to constitute a series circuit. The load voltage Vo is applied to the load 14 from this series circuit. As described above, therefore, the load voltage Vo is the sum of the output voltage Va of the power conversion unit 12a, the output voltage Vb of the power conversion unit 12b, and the output voltage Vc of the power conversion unit 12c. That is, the relationship between the load voltage Vo and the output voltages of the individual power conversion units 12 is represented by the following formula (1):

$$Vo = Va + Vb + Vc \quad (1)$$

The load voltage Vo is controlled by the control unit 15 to be the target value Vaim which is designated from the outside of the control unit 15. Note that the target value Vaim may be predetermined in the control unit 15. For example, the target value Vaim may be a fixed value stored in a memory (not illustrated) incorporated in the control unit 15.

The target value Vaim is set to a value smaller than the sum of a maximum output voltage Va_max of the power conversion unit 12a, a maximum output voltage Vb_max of the power conversion unit 12b, and a maximum output voltage Vc_max of the power conversion unit 12c. That is, the relationship between the target value Vaim and the maximum output voltages of the individual power conversion units 12 is represented by the following formula (2):

$$Vaim \leq Va\_max + Vb\_max + Vc\_max \quad (2)$$

The same circuit configuration and the same circuit components are used for each of the power conversion units 12. Therefore, the maximum output voltage Va_max of the power conversion unit 12a, the maximum output voltage Vb_max of the power conversion unit 12b, and the maximum output voltage Vc_max of the power conversion unit 12c are substantially the same voltages. That is, the following formula (3) is established:

$$Va\_max \approx Vb\_max \approx Vc\_max \quad (3)$$

It can be understood from formula (1) that the load voltage Vo may be adjusted to the target value Vaim by deciding the target values for the output voltages of the individual power conversion units 12 based on the target value Vaim and controlling the individual power conversion units 12 in accordance with the respective target values.

Figure 3:
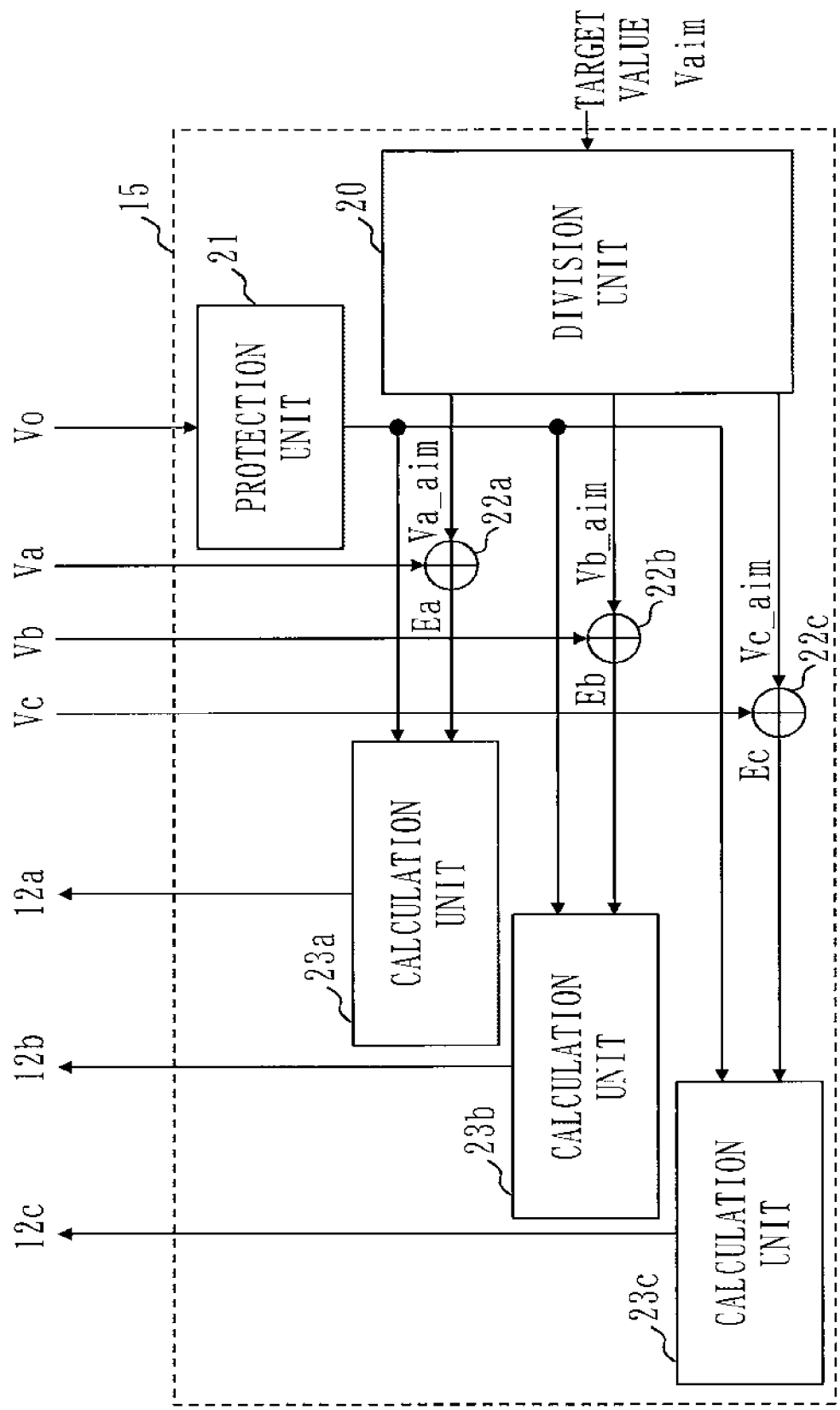
FIG. 3 is a block diagram illustrating a configuration of a control unit of the power conversion apparatus according to the first embodiment.

In this embodiment, as illustrated in FIG. 3, the control unit 15 receives the target value Vaim from the outside at the division unit 20. The division unit 20 converts the target value Vaim to the target values for the output voltages of the individual power conversion units 12. Specifically, the division unit 20 divides the target value Vaim into a target value Va_aim for the output voltage Va of the power conversion unit 12a, a target value Vb_aim for the output voltage Vb of the power conversion unit 12b, and a target value Vc_aim for the output voltage Vc of the power conversion unit 12c. A method of dividing the target value Vaim will be described later.

The adder 22a calculates an error Ea between the target value Va_aim output from the division unit 20 and the output voltage Va of the power conversion unit 12a. Similarly, the adder 22b calculates an error Eb between the target value Vb_aim output from the division unit 20 and the output voltage Vb of the power conversion unit 12b. Similarly, the adder 22c calculates an error Ec between the target value Vc_aim output from the division unit 20 and the output voltage Vc of the power conversion unit 12c. An error Ex is represented by the following formula (4), where x=a,b,c:

$$Ex = Vx\_aim - Vx \quad (4)$$

The calculation unit 23a receives an input of the error Ea. Using a control method such as PI control or PID control, the calculation unit 23a calculates a command value for the power conversion unit 12a from the error Ea. The calculation unit 23a generates a PWM signal indicating the calculated command value. If a signal to permit output has been input from the protection unit 21, the calculation unit 23a outputs the generated PWM signal to the power conversion unit 12a. On the other hand, if a command signal to stop output has been input from the protection unit 21, the calculation unit 23a does not output the generated PWM signal to the power conversion unit 12a, or outputs a PWM signal indicating a command value of 0 V to the power conversion unit 12a. Similarly, the calculation unit 23b calculates a command value for the power conversion unit 12b from the error Eb. If a signal to permit output has been input from the protection unit 21, the calculation unit 23b outputs a PWM signal indicating the calculated command value to the power conversion unit 12b. Similarly, the calculation unit 23c calculates a command value for the power conversion unit 12c from the error Ec. If a signal to permit output has been input from the protection unit 21, the calculation unit 23c outputs a PWM signal indicating the calculated command value to the power conversion unit 12c.

The protection unit 21 compares the load voltage Vo with a predetermined overvoltage threshold. If the load voltage Vo does not exceed the overvoltage threshold, the protection unit 21 outputs a signal to permit output to each of the calculation unit 23a, the calculation unit 23b, and the calculation unit 23c. On the other hand, if the load voltage Vo exceeds the overvoltage threshold, the protection unit 21 outputs a command signal to stop output to each of the calculation unit 23a, the calculation unit 23b, and the calculation unit 23c.

In this embodiment, as described above, if the sum of the voltages output from the plurality of the power conversion units 12 exceeds the threshold, the control unit 15 stops the output of the power conversion units 12 individually. Therefore, circuit failure due to overvoltage can be prevented.

The concept of a high efficiency control method according to this embodiment will be described with reference to FIG. 4 and FIG. 5.

The output voltage Va of the power conversion unit 12a which results in the maximum conversion efficiency of the power conversion unit 12a will be referred to as a maximum efficiency voltage Va_η of the power conversion unit 12a. Similarly, the output voltage Vb of the power conversion unit 12b which results in the maximum conversion efficiency of the power conversion unit 12b will be referred to as a maximum efficiency voltage Vb_η of the power conversion unit 12b. Similarly, the output voltage Vc of the power conversion unit 12c which results in the maximum conversion efficiency of the power conversion unit 12c will be referred to as a maximum efficiency voltage Vc_η of the power conversion unit 12c.

In this embodiment, the same circuit configuration and the same circuit components are used for all of the power conversion unit 12a, the power conversion unit 12b, and the power conversion unit 12c. Therefore, the maximum efficiency voltage Va_η of the power conversion unit 12a, the maximum efficiency voltage Vb_η of the power conversion unit 12b, and the maximum efficiency voltage Vc_η of the power conversion unit 12c are substantially the same voltages. That is, the following formula (5) is established:

$$Va\_η \approx Vb\_η \approx Vc\_η \quad (5)$$

Figure 4:
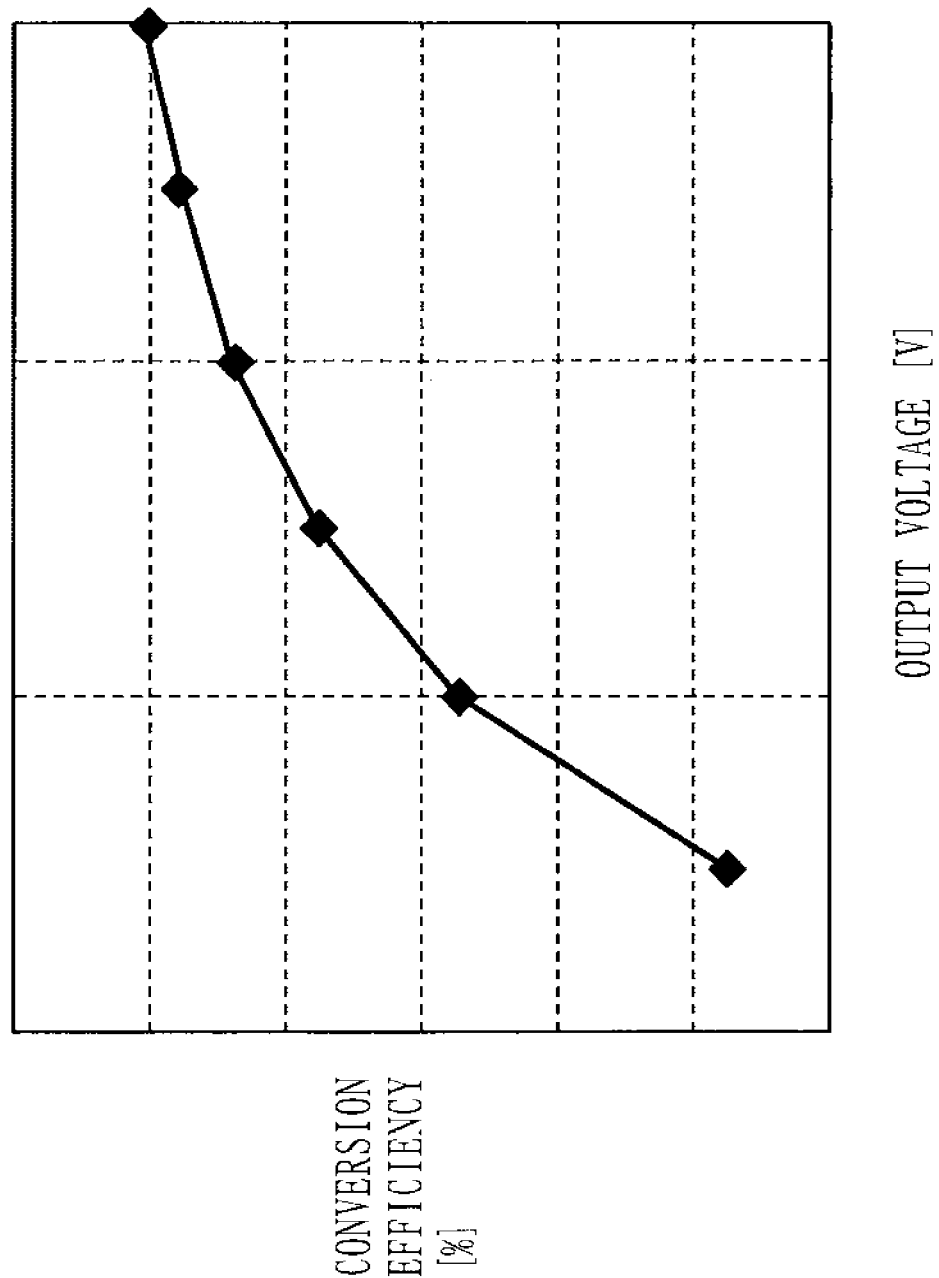
FIG. 4 is a graph illustrating a relationship between the output voltage and conversion efficiency of each power conversion unit of the power conversion apparatus according to the first embodiment.

FIG. 4 illustrates a relationship between the output voltage and conversion efficiency of each of the power conversion units 12. In FIG. 4, the horizontal axis represents the output voltage and the vertical axis represents the conversion efficiency.

In this embodiment, as illustrated in FIG. 4, each of the power conversion units 12 has a characteristic that the conversion efficiency improves as the output voltage increases. Note that in this embodiment, the output current of each of the power conversion units 12 is constant.

Due to the characteristic illustrated in FIG. 4, the maximum output voltage of each of the power conversion units 12 and the maximum efficiency voltage of each of the power conversion units 12 are substantially the same voltages. That is, the following formula (6) is established, where x=a, b, c:

$$Vx\_max \approx Vx\_η \quad (6)$$

Based on formula (2) and formula (6), the following formula (7) is established:

$$Vaim \leq Va\_η + Vb\_η + Vc\_η \quad (7)$$

When it is assumed that the three power conversion units 12 are operated at the same efficiency, the efficiency of every one of the power conversion units 12 becomes lower than the maximum efficiency under the condition of the following formula (8):

$$Vaim \geq (2/3)(Va\_η + Vb\_η + Vc\_η) \quad (8)$$

Suppose that the output voltage Va of the power conversion unit 12a is adjusted to one-third of the target value Vaim, the output voltage Vb of the power conversion unit 12b is adjusted to one-third of the target value Vaim, and the output voltage Vc of the power conversion unit 12c is adjusted to one-third of the target value Vaim. In this case, it may be possible that large rises in temperature due to power loss may occur in all heat-generating components of the power conversion unit 12a, the power conversion unit 12b, and the power conversion unit 12c. That is, without a large radiator, there is a risk of hot spots occurring in all of the power conversion units 12.

On the other hand, even under the condition of formula (8), the number of the power conversion units 12 in which efficiency is lowered can be limited to one by operating two of the power conversion units 12 at the maximum efficiency and adjusting the overall output voltage with the remaining one of the power conversion units 12.

Suppose, for example, that the output voltage Va of the power conversion unit 12a is set to the maximum efficiency voltage Va_η, the output voltage Vb of the power conversion unit 12b is set to the maximum efficiency voltage Vb_η, and the output voltage Vc of the power conversion unit 12c is adjusted to a voltage obtained by subtracting the maximum efficiency voltage Va_η and the maximum efficiency voltage Vb_η from the target value Vaim. In this case, the power loss of the power conversion unit 12a and the power conversion unit 12b can be minimized, so that large rises in temperature do not occur in the heat-generating components of the power conversion unit 12a and the power conversion unit 12b. That is, ever without a large radiator, hot spots do not occur in the two power conversion units 12 operating at the maximum efficiency.

The loss of the power conversion unit 12c with the adjusted output voltage becomes relatively large, compared with the loss of each of the power conversion unit 12a and the power conversion unit 12b operating at the maximum efficiency. If the power conversion unit 12c is constantly operating at an efficiency lower than the maximum efficiency, it may be possible that a large rise in temperature occurs in a heat-generating component, such as a MOSFET, an IGBT, a diode, a transformer, or a coil, of the power conversion unit 12c. That is, without a large radiator, there is a risk of a hot spot occurring in the power conversion unit 12 with the adjusted output voltage.

In this embodiment, therefore, the control unit 15 periodically performs rotation for switching the power conversion units 12 to operate at the maximum efficiency and the power conversion unit 12 whose output voltage is adjusted among the three power conversion units 12. With this rotation, rises in temperature occurring in the individual power conversion units 12 can be equalized. As a result, even without a large radiator, a hot spot is unlikely to occur. Thus, the size of the power conversion apparatus 10 can be reduced.

Figure 5:
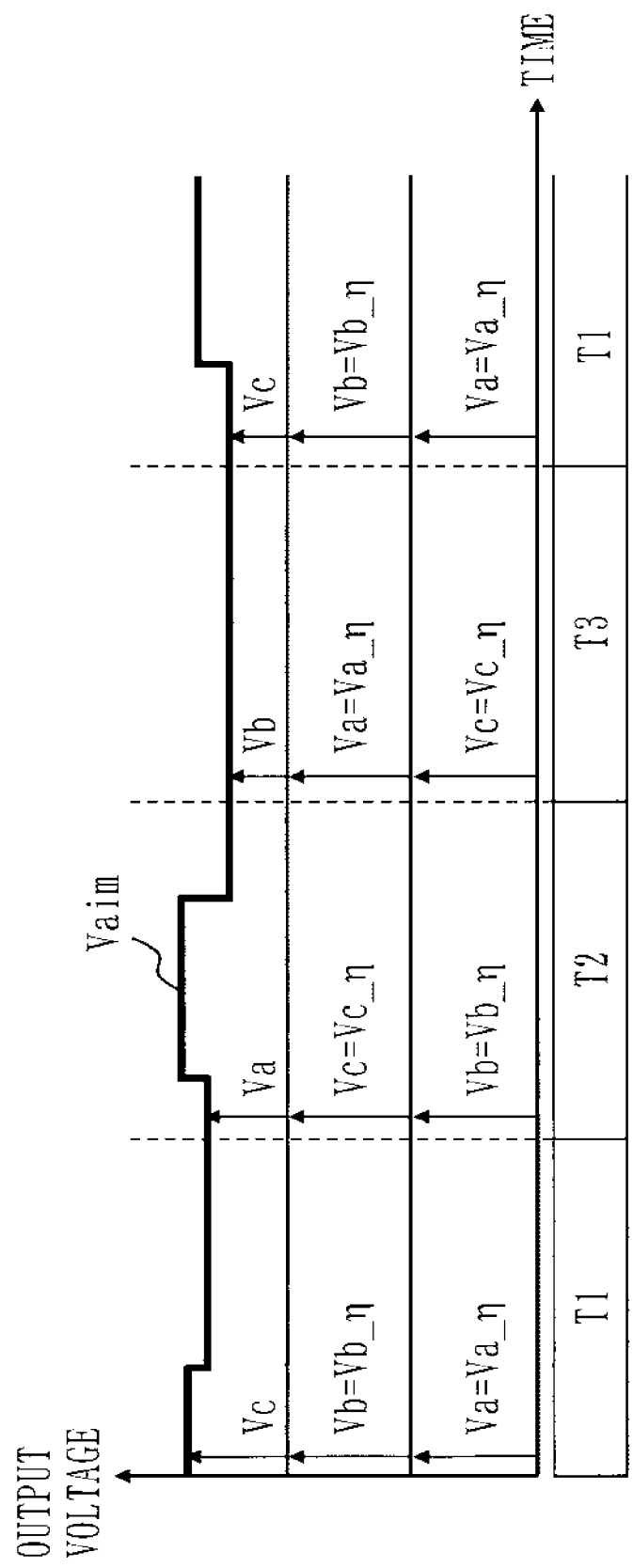
FIG. 5 is a diagram illustrating an example allocation of output voltages along the time axis by the control unit of the power conversion apparatus according to the first embodiment.
Figure 6:
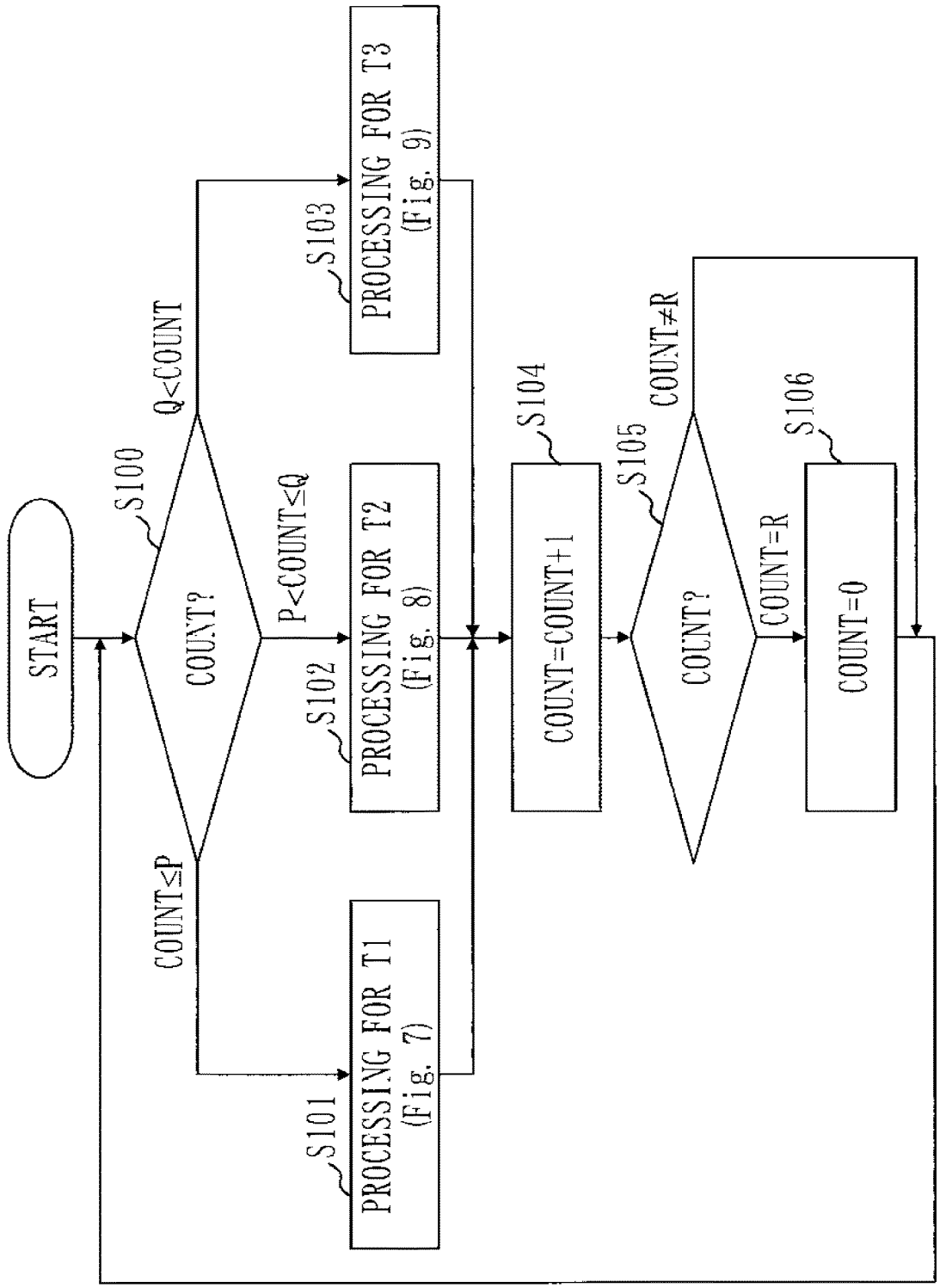
FIG. 6 is a flowchart illustrating the operation of the control unit of the power conversion apparatus according to the first embodiment.

FIG. 5 illustrates an example allocation of output voltages along the time axis by the control unit 15. In FIG. 5, the horizontal axis represents the time axis and the vertical axis represents the output voltage. The hand below the time axis indicates periods of T1, T2, and T3 equal in length. The uppermost line in FIG. 5 represents the target value Vaim from the outside.

In the example illustrated in FIG. 5, rotation for switching the power conversion units 12 whose output voltages are set to the maximum efficiency voltages and the power conversion unit 12 whose output voltage is adjusted in accordance with the target value Vaim is performed periodically among the three power conversion units 12. Specifically, in T1, the output voltage Va of the power conversion unit 12a is set to the maximum efficiency voltage Va_η, the output voltage Vb of the power conversion unit 12b is set to the maximum efficiency voltage Vb_η, and the output voltage Vc of the power conversion unit 12c is adjusted to a voltage obtained by subtracting the maximum efficiency voltage Va_η and the maximum efficiency voltage Vb_η from the target value Vaim. In T2, the output voltage Vb of the power conversion unit 12B is set to the maximum efficiency voltage Vb_η the output voltage Vc of the power conversion unit 12c is set to the maximum efficiency voltage Vc_η, and the output voltage Va of the power conversion unit 12a is adjusted to a voltage obtained by subtracting the maximum efficiency voltage Vb_η and the maximum efficiency voltage Vc_η from the target value Vaim. In T3, the output voltage Vc of the power conversion unit 12c is set to the maximum efficiency voltage Vc_η, the output voltage Va of the power conversion unit 12a is set to the maximum efficiency voltage Va_η, and the output voltage Vb of the power conversion unit 12b is adjusted to a voltage obtained by subtracting the maximum efficiency voltage Vc_η and the maximum efficiency voltage Va_η from the target value Vaim.

Note that it is sufficient that the rotation is performed earlier than the time constant of the rise in temperature in each heat-generating component which is the part where loss occurs. In this embodiment, therefore, the rotation is performed at intervals on the order of several minutes. That is, the length of each period of T1, T2, and T3 is set to be longer than 1 minute and shorter than 10 minutes.

In this embodiment, the rotation is performed at regular time intervals. However, it may be determined whether to perform the rotation based on the measurement value of the temperature in the heat-generating component of each of the power conversion units 12. As a specific example, the control unit 15 may use a temperature sensor such as a thermocouple to detect the temperature of a specific heat-generating component, and perform the rotation when the detected temperature exceeds a temperature threshold set in the control unit 15.

The operation of the control unit 15 will be described with reference to FIGS. 6, 7, 8, and 9. Specifically, the operation of the division unit 20 will be described. The operation to be described here corresponds to the method of dividing the target value Vaim.

In step S100, the division unit 20 checks the numerical value of COUNT which is an internal variable with an initial value of 0. Specifically, the division unit 20 compares the numerical value of COUNT with predetermined P and Q. The value of P is preset to a value obtained by dividing the length of the period of T1 by a time corresponding to 1 of COUNT. The value of Q is preset to a value obtained by dividing the total length of the periods of T1 and T2 by the time corresponding to 1 of COUNT. As a specific example, assume that the length of each period of T1 and T2 is 5 minutes and COUNT is incremented every minute. In that case, the value of P is set to 5 and the value of Q is set to 10.

Figure 7:
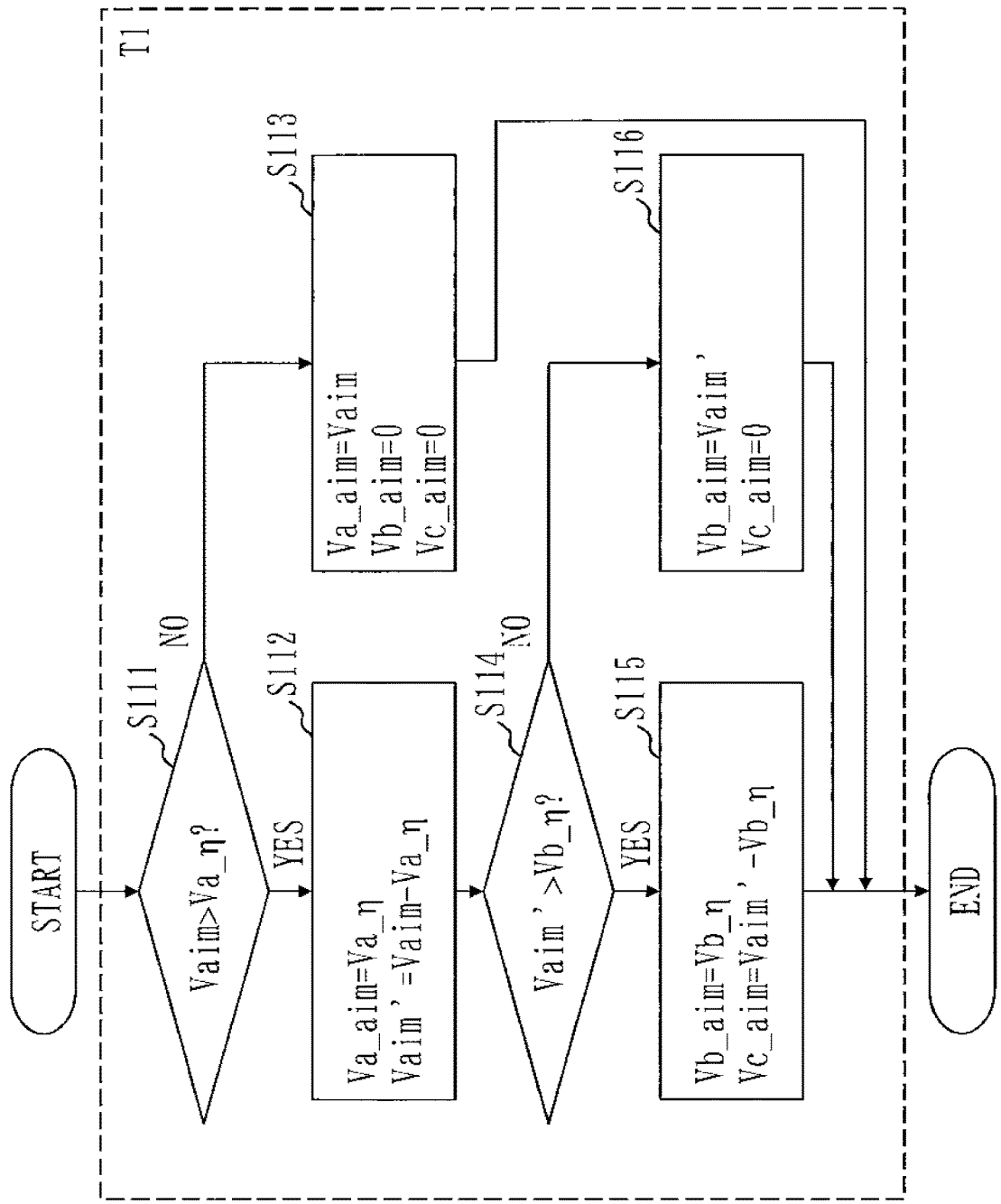
FIG. 7 is a flowchart illustrating the operation of the control unit of the power conversion apparatus according to the first embodiment.

If COUNT is less than or equal to P in step S100, the division unit 20 executes processing for T1 illustrated in FIG. 7 in step S101.

In step S111, the division unit 20 compares the target value Vaim from the outside with the value of the maximum efficiency voltage Va_η of the power conversion unit 12a.

If the target value Vaim from the outside is larger than the maximum efficiency voltage Va_η of the power conversion unit 12a in step S111, the division unit 20 sets the target value Va_aim of the power conversion unit 12a to the same value as the maximum efficiency voltage Va_η in step S112. The division unit 20 also stores a result of subtracting the value of the maximum efficiency voltage Va_η of the power conversion unit 12a from the target value Vaim from the outside as an updated value Vaim'. The updated value Vaim' is stored, for example, in a memory or a register (not illustrated) incorporated in the control unit 15.

If the target value Vaim from the outside is less than or equal to the maximum efficiency voltage Va_η of the power conversion unit 12a in step S111, the division unit 20 sets the target value Va_aim of the power conversion unit 12a to the same value as the target value Vaim from the outside in step S113. The division unit 20 also sets each of the target value Vb_aim of the power conversion unit 12b and the target value Vc_aim of the power conversion unit 12c to 0 V.

After step S112, the division unit 20 compares the updated value Vaim' with the value of the maximum efficiency voltage Vb_η of the power conversion unit 12b in step S114.

If the updated value Vaim' is larger than the maximum efficiency voltage Vb_η of the power conversion unit 12b in step S114, the division unit 20 sets the target value Vb_aim of the power conversion unit 12b to the same value as the maximum efficiency voltage Vb_η in step S115. The division unit 20 also sets the target value Vc_aim of the power conversion unit 12c to a value obtained by subtracting the value of the maximum efficiency voltage Vb_η of the power conversion unit 12b from the updated value Vaim'.

If the updated value Vaim' is less than or equal to the maximum efficiency voltage Vb_η of the power conversion unit 12b in step S114, the division unit 20 sets the target value Vb_aim of the power conversion unit 12b to the same value as the updated value Vaim' in step S116. The division unit 20 also sets the target value Vc_aim of the power conversion unit 12c to 0 V.

Figure 8:
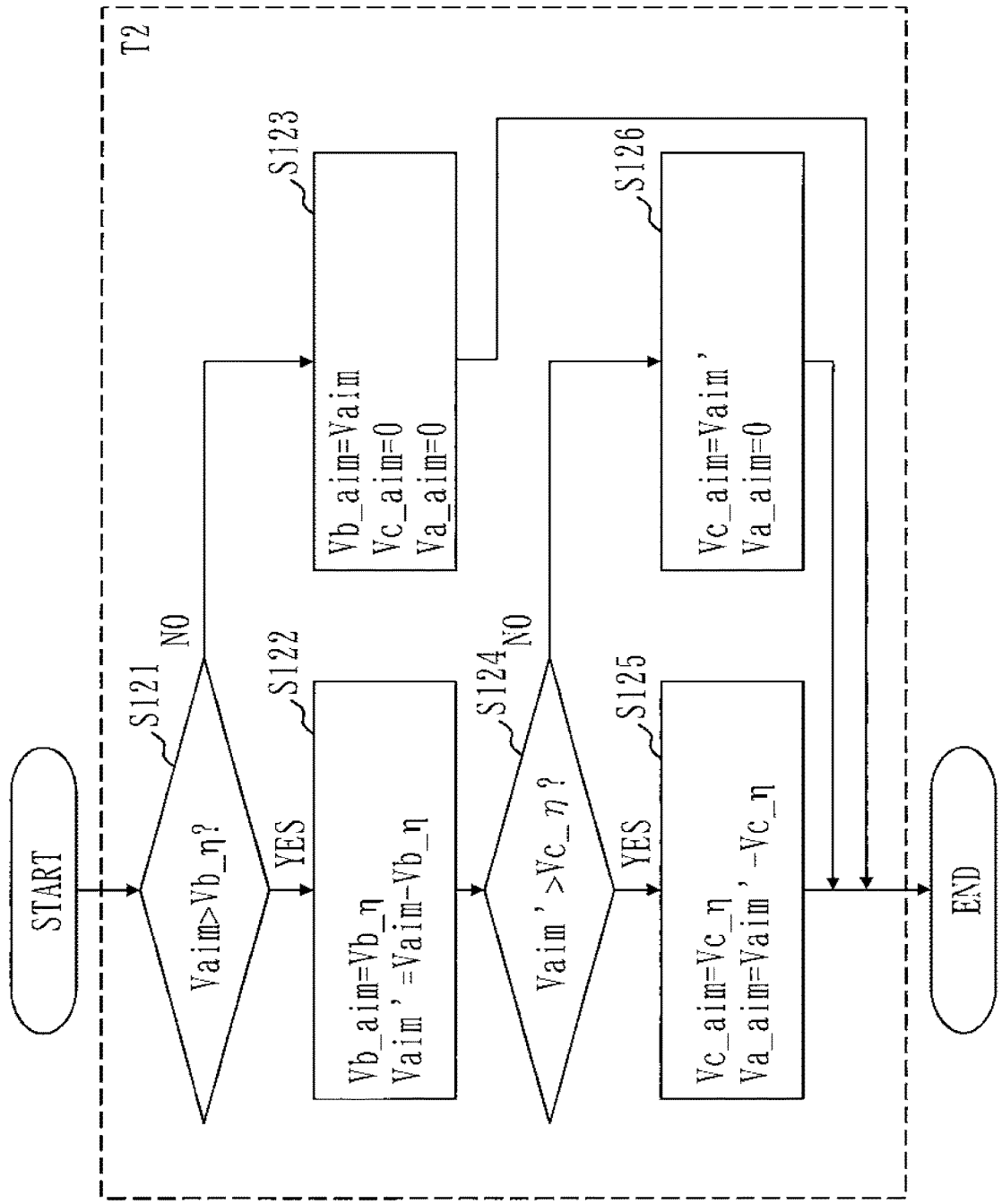
FIG. 8 is a flowchart illustrating the operation of the control unit of the power conversion apparatus according to the first embodiment.

If COUNT is larger than P and less than or equal to Q in step S100, the division unit 20 executes processing for T2 illustrated in FIG. 8 in step S102.

In step S102, the processing executed for the power conversion unit 12a, the processing executed for the power conversion unit 12b, and the processing executed for the power conversion unit 12c in step S101 are performed for the power conversion unit 12b, the power conversion unit 12c, and the power conversion unit 12a, respectively That is, the processing executed in step S121 to step S126 is the same as the processing executed in step S111 to step S116, respectively, except that "a" is replaced with "b", "b" is replaced with "c", and "c" is replaced with "a".

Figure 9:
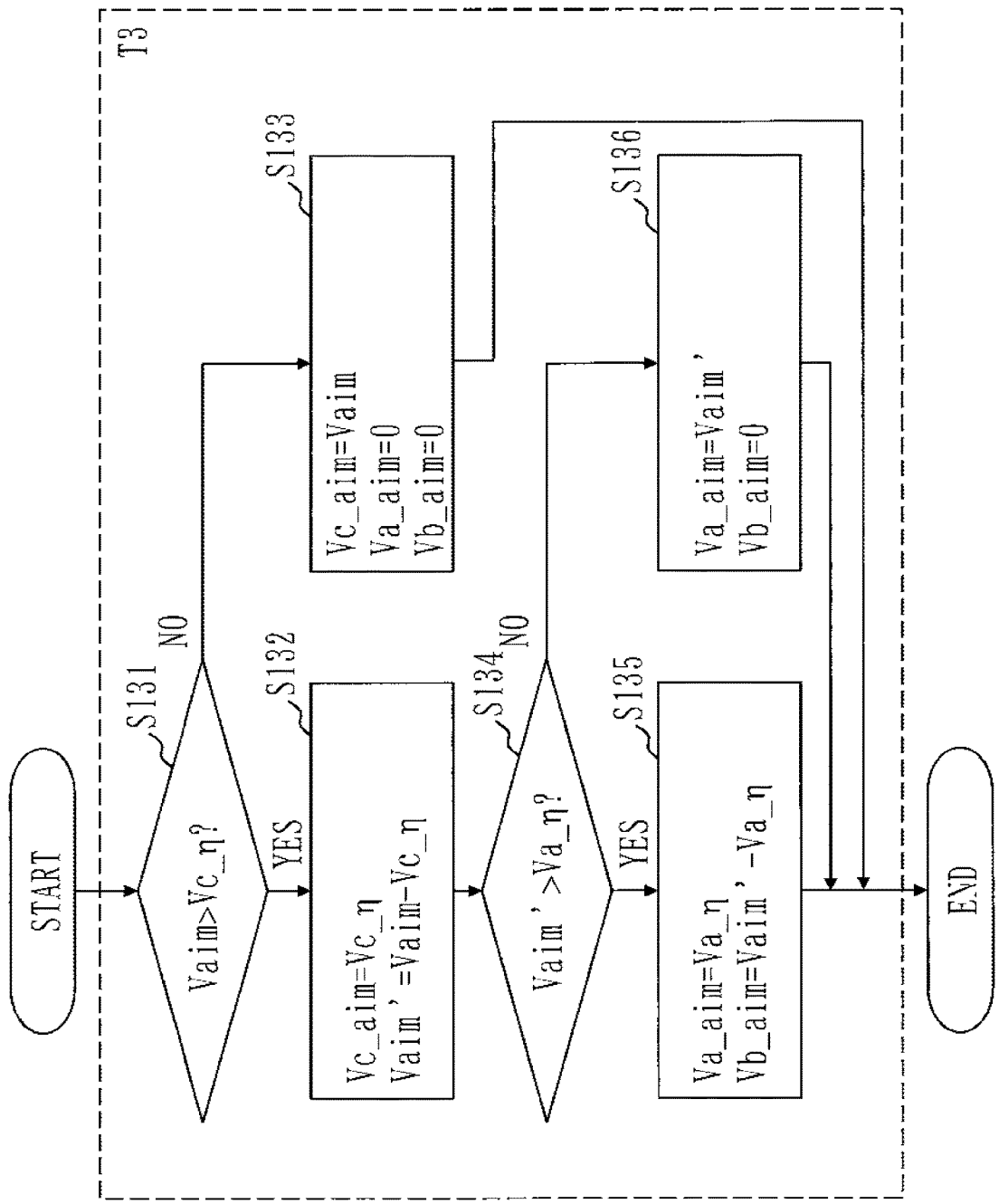
FIG. 9 is a flowchart illustrating the operation of the control unit of the power conversion apparatus according to the first embodiment.

If COUNT is larger than Q in step S100, the division unit 20 executes processing for T3 illustrated in FIG. 9 in step S103.

In step S103, the processing executed for the power conversion unit 12a, the processing executed for the power conversion unit 12b, and the processing executed for the power conversion unit 12c in step S101 are performed for the power conversion unit 12c, the power conversion unit 12a, and the power conversion unit 12b, respectively. That is, the processing executed in step S131 to step S136 is the same as the processing executed in step S111 to step S116, respectively, except that "a" is replaced with "c", "b" is replaced with "a", and "c" is replaced with "b".

After one of step S101, step S102, and step S103, the division unit 20 updates COUNT so that the numerical value of COUNT increases by 1 in step S104. That is, the division unit 20 increments COUNT.

After step S104, the division unit 20 checks the numerical value of COUNT in step S105. Specifically, the division unit 20 compares the numerical value of COUNT with predetermined R. The value of R is preset to a value obtained by dividing the total length of the periods of T1, T2, and T3 by the time corresponding to 1 of COUNT. As a specific example, assume that the length of each period of T1, T2, and T3 is 5 minutes and COUNT is incremented every minute. In that case, the value of R is set to 15.

If COUNT is equal to R in stop S105, the division unit 20 resets COUNT to 0 in step S106.

If COUNT is not equal to R in step S105, or after step S106, the operation of the division unit 20 is terminated once. Then, the operation of the division unit 20 is resumed from step S100.

In this embodiment, the internal variable COUNT is used to control the rotation of the power conversion units 12, hut the rotation may be controlled using any periodic timer. That is, the rotation may be performed once per period of the timer.

*Description of Effect of Embodiment*

In this embodiment, when making one or more of the power conversion units 12 output a first voltage which is fixed and making a different one of the power conversion units 12 output a second voltage which is adjusted in accordance with the target value Vaim, the control unit 15 repeatedly switches the power conversion unit 12 to output the second voltage among three of the power conversion units 12. Thus, heat generation can be dispersed. As a result, a hot spot is unlikely to occur in the power conversion apparatus 10. Note that the power conversion unit 12 to output the second voltage may be switched at least between two of the power conversion units 12. For example, even when there are three of the power conversion units 12, the power conversion unit 12 to output the second voltage may be switched between two of the power conversion units 12 as in a second embodiment to be described later.

The first voltage is a fixed voltage against the target value Vaim. Therefore, even when the target value Vaim is increased or decreased, the first voltage is not increased or decreased. However, when the target value Vaim is decreased, the output of the first voltage may be stopped so that the overall output voltage does not exceed the target value Vaim. On the other hand, the second voltage is a variable voltage in relation to the target value Vaim. Therefore, when the target value Vaim is increased or decreased, the second voltage is also increased or decreased. Note that when the target value Vaim is decreased and the output of the first voltage is stopped, the second voltage may be increased so that the overall output voltage does not become lower than the target value Vaim.

In this embodiment, when making one of the power conversion units 12 output the second voltage and making the rest of the power conversion units 12 output the first voltage, the control unit 15 switches the power conversion unit 12 to output the second voltage among the plurality of the power conversion units 12 in turn. Thus, rises in temperature due to loss can be equalized among the power conversion units 12. As a result, a hot spot is more unlikely to occur in the power conversion apparatus 10.

In this embodiment, the plurality of the power conversion units 12 each have a characteristic that conversion efficiency of each of the power conversion units 12 is maximized when a voltage output from each of the power conversion units 12 is the first voltage. That is, the first voltage that is output by one of the power conversion units 12 is the maximum efficiency voltage of the said power conversion unit 12. Thus, heat generation of the power conversion unit 12 that outputs the first voltage can be minimized. Note that the first voltage that is output by one of the power conversion unit 12 may be other than the maximum efficiency voltage of the said power conversion unit 12 as long as it is a fixed voltage. However, it is desirable that the first voltage be close to the maximum efficiency voltage of the said power conversion unit 12.

In this embodiment, the first voltage that is output by one of the power conversion units 12 is the maximum output voltage of the said power conversion unit 12. Thus, a wide range of values can be supported as the target value Vaim. Note that the maximum efficiency voltage of each of the power conversion units 12 does not have to coincide with the maximum output voltage of each of the power conversion units 12. It is desirable that the first voltage that is output by one of the power conversion units 12, even when differing greatly from the maximum output voltage of the said power conversion unit 12, be the same as the maximum efficiency voltage of the said power conversion unit 12 or a voltage close to the maximum efficiency voltage of the said power conversion unit 12.

In this embodiment, the control unit 15 switches the power conversion unit 12 to output the second voltage at equal time intervals. Thus, rises in temperature due to loss can be easily equalized among the power conversion units 12. As a modification example, the control unit 15 may detect the temperature of the power conversion unit 12 to output the second voltage, and when the detected temperature exceeds a threshold, the control unit 15 may switch the power conversion unit 12 to output the second voltage. According to this modification example, it is possible to reliably prevent a rise in temperature in each of the power conversion units 12 from exceeding a predetermined level.

In this embodiment, the control unit 15 repeatedly switches priorities of the plurality of the power conversion units 12. Specifically, in the T1 period, the control unit 15 sets the priority of the power conversion unit 12a to the first, the priority of the power conversion unit 12b to the second, and the priority of the power conversion unit 12c to the third. In the T2 period, the control unit 15 sets the priority of the power conversion unit 12b to the first, the priority of the power conversion unit 12c to the second, and the priority of the power conversion unit 12a to the third. In the T3 period, the control unit 15 sets the priority of the power conversion unit 12c to the first, the priority of the power conversion unit 12a to the second, and the priority of the power conversion unit 12b to the third.

The control unit 15 selects the power conversion unit 12 to output the first voltage from the plurality of the power conversion units 12 one by one in accordance with the priorities, to an extent that the sum of voltages output from the plurality of the power conversion units 12 does not exceed the target value Vaim. When the sum of voltages output from the selected power conversion units 12 is lower than the target value Vaim, the control unit 15 selects the power conversion unit 12 to output a shortfall as the second voltage from the plurality of the power conversion units 12 in accordance with the priorities.

In this embodiment, one or two of the power conversion units 12 may stop output because the target value Vaim is low. However, as described above, by repeatedly switching the priorities, the power conversion unit 12 to stop output can also be switched repeatedly among three of the power conversion units 12. Thus, rises in temperature due to loss can be easily equalized among the power conversion units 12.

In this embodiment, the control unit 15 divides the target value Vaim into target values to be allocated to the individual power conversion units 12. Division of the target value Vaim is performed repeatedly so that the power conversion units 12 to operate at the maximum efficiency and the power conversion unit 12 to output a voltage obtained by subtracting the output voltages of the power conversion units 12 to operate at the maximum efficiency from the target value Vaim are switched earlier than the time constant of the rise in temperature in each heat-generating component. Thus, a large radiator is not required, and the size of the power conversion apparatus 10 can be reduced.

*Other Configurations*

In this embodiment, the power conversion apparatus 10 is included in the electric propulsion system 30. As a modification example, the power conversion apparatus 10 may be included in a different system. This different system may be a system including an element similar to the load 14 which uses power provided from the power conversion apparatus 10.

In this embodiment, all combinations of the direct current voltage source 11, the power conversion unit 12, and the capacitor 13 are implemented with the same circuit configuration and the same circuit components. As a modification example, the combinations of the direct current voltage source 11, the power conversion unit 12, and the capacitor 13 may be implemented with respectively different circuit configurations or respectively different circuit components.

In this embodiment, the power conversion apparatus 10 includes three of the power conversion units 12. As a modification example, the power conversion apparatus 10 may include two of the power conversion units 12. In such an example, when making one of the power conversion units 12 output the first voltage which is fixed and making the other one of the power conversion units 12 output the second voltage which is adjusted in accordance with the target value Vaim, the control unit 15 switches the power conversion unit 12 to output the first voltage and the power conversion unit 12 to output the second voltage alternately between the two power conversion units 12. Thus, heat generation can be dispersed as in this embodiment. As another modification example, the power conversion apparatus 10 may include four of the power conversion units 12. In such an example, when making one or more of the power conversion units 12 output the first voltage which is fixed and making a different one of the power conversion units 12 output the second voltage which is adjusted in accordance with the target value Vaim, the control unit 15 repeatedly switches the power conversion unit 12 to output the second voltage among the four power conversion units 12. Thus, heat generation can be dispersed as in this embodiment. As yet another modification example, the power conversion apparatus 10 may include five or more of the power conversion units 12.

Second Embodiment

With regard to this embodiment, differences from the first embodiment will be mainly described with reference to FIGS. 10 to 14.

In the first embodiment, when making one or more of the power conversion units 12 output the first voltage which is fixed and making a different one of the power conversion units 12 output the second voltage which is adjusted in accordance with the target value Vaim, the control unit 15 switches the power conversion unit 12 to output the second voltage among "three" of the power conversion units 12. In this embodiment, when making one or more of the power conversion units 12 output the first voltage which is fixed and making a different one of the power conversion units 12 output the second voltage which is adjusted in accordance with the target value Vaim, the control unit 15 repeatedly switches the power conversion unit 12 to output the second voltage between "two" of the power conversion units 12.

*Description of Configuration*

The configuration of an electric propulsion system 30 according to this embodiment is the same as that of the first embodiment illustrated in FIG. 1, and thus description will be omitted.

The configuration of the control unit 15 is also the same as that of the first embodiment illustrated in FIG. 3, and thus description will be omitted.

*Description of Operation*

The concept of a high efficiency control method according to this embodiment will be described with reference to FIG. 10.

Also in this embodiment, each of the power conversion units 12 has a characteristic that the conversion efficiency improves as the output voltage increases as illustrated in FIG. 4.

Figure 10:
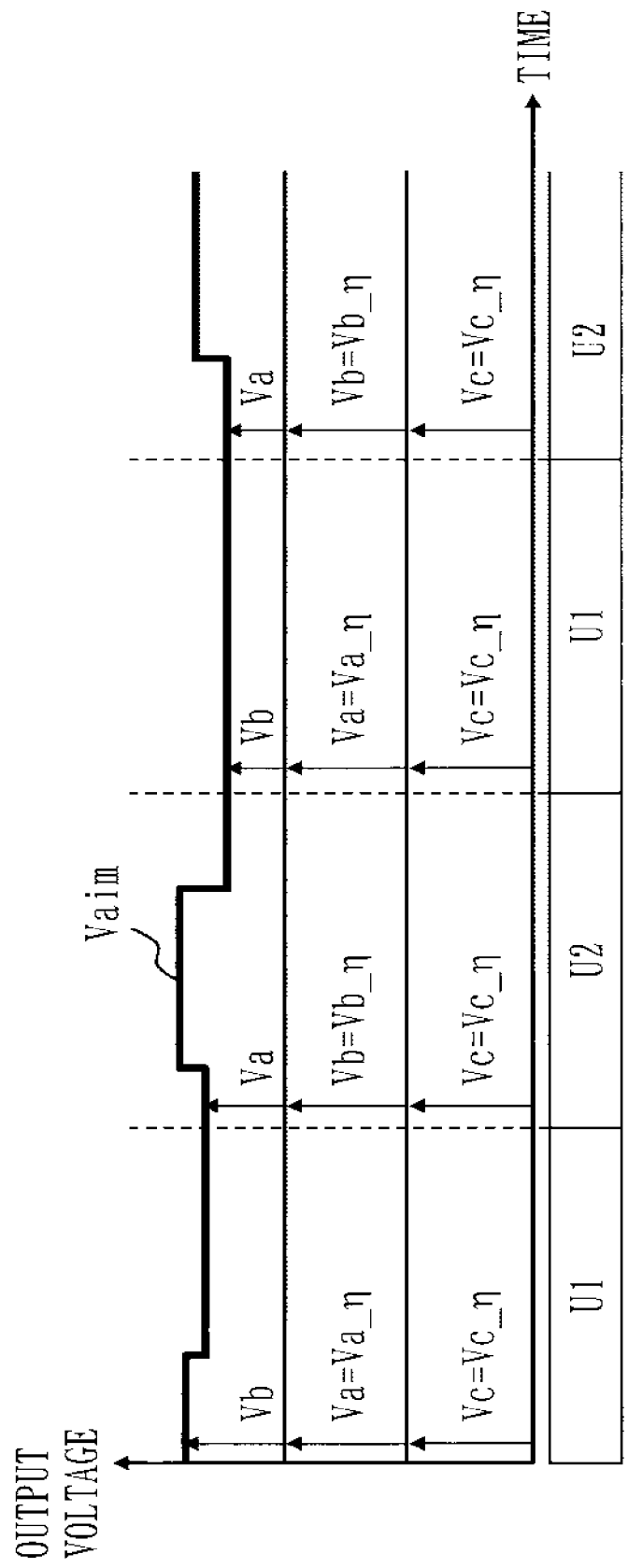
FIG. 10 is a diagram illustrating an example allocation of output voltages along the time axis by a control unit of a power conversion apparatus according to a second embodiment.
Figure 11:
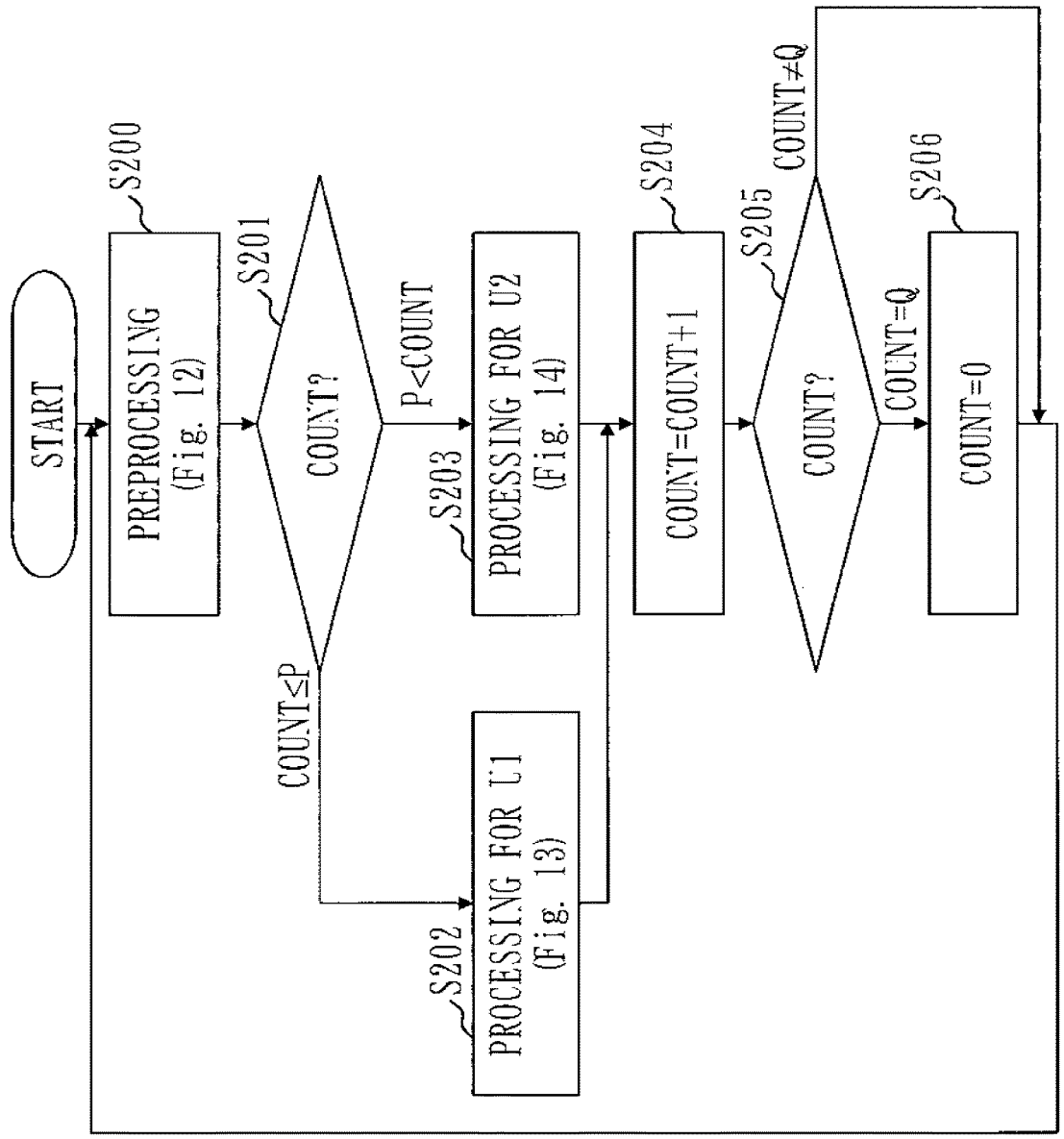
FIG. 11 is a flowchart illustrating the operation of the control unit of the power conversion apparatus according to the second embodiment.

FIG. 10 illustrates an example allocation of output voltages along the time axis by the control unit 15. Differently from FIG. 5, the hand below the time axis represents the periods of U1 and U2 equal in length.

In the example illustrated in FIG. 10, the output voltage of a predetermined one of the power conversion units 12 is always set to the maximum efficiency voltage. Then, between the remaining two power conversion units 12, the power conversion unit 12 whose output voltage is set to the maximum efficiency voltage and the power conversion unit 12 whose output voltage is adjusted in accordance with the target value Vaim are regularly switched. Specifically, in both U1 and U2, the output voltage Vc of the power conversion unit 12c is set to the maximum efficiency voltage $Vc\_\eta$. In U1, the output voltage Va of the power conversion unit 12a is set to the maximum efficiency voltage $Va\_\eta$ and the output voltage Vb of the power conversion unit 12b is adjusted to a voltage obtained by subtracting the maximum efficiency voltage $Vc\_\eta$ and the maximum efficiency voltage $Va\_\eta$ from the target value Vaim. In U2, the output voltage Vb of the power conversion unit 12b is set to the maximum efficiency voltage $Vb\_\eta$, and the output voltage Va of the power conversion unit 12a is adjusted to a voltage obtained by subtracting the maximum efficiency voltage $Vc\_\eta$ and the maximum efficiency voltage $Vb\_\eta$ from the target value Vaim.

The length of each period of U1 and U2 is the same as the length of each period of T1, T2, and T3 in the first embodiment.

The operation of the control unit 15 will be described with reference to FIGS. 11, 12, 13, and 14. Specifically, the operation of the division unit 20 will be described. The operation to be described here corresponds to the method of dividing the target value Vaim.

Figure 12:
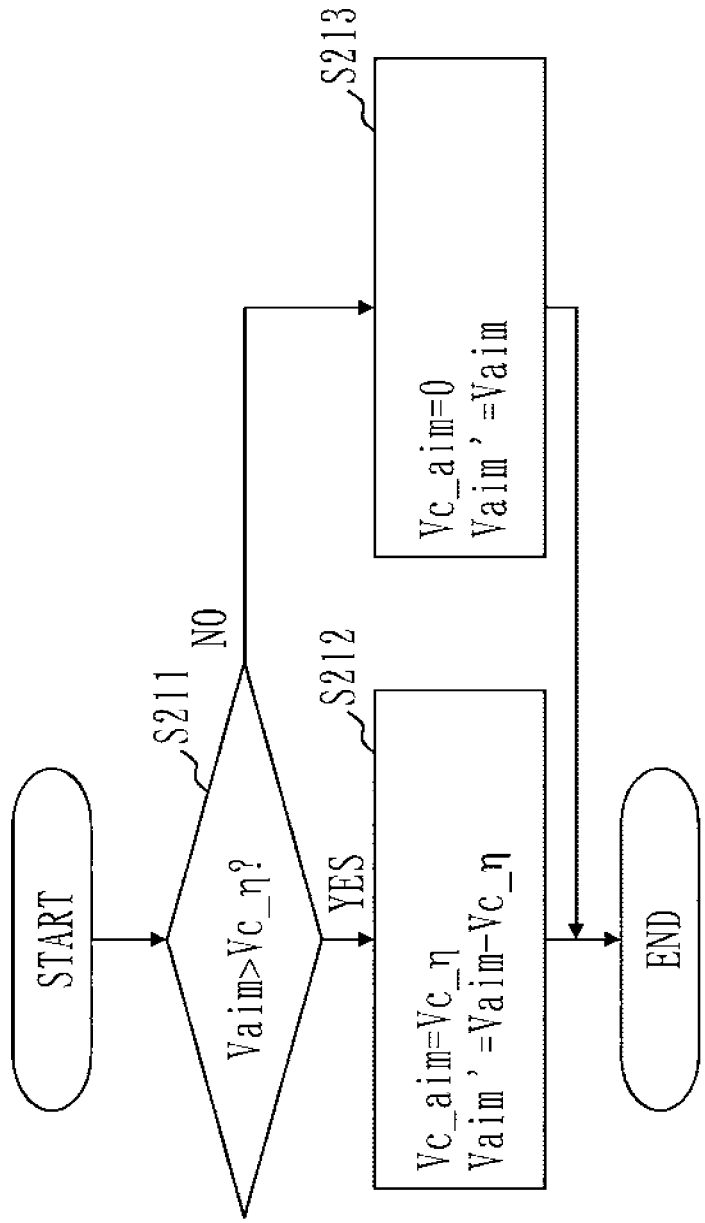
FIG. 12 is a flowchart illustrating the operation of the control unit of the power conversion apparatus according to the second embodiment.

In step S200, the division unit 20 executes preprocessing illustrated in FIG. 12.

In step S211, the division unit 20 compares the target value Vaim from the outside with the value of the maximum efficiency voltage $Vc\_\eta$ of the power conversion unit 12c.

If the target value Vaim from the outside is larger than the maximum efficiency voltage $Vc\_\eta$ of the power conversion unit 12c in step S211, the division unit 20 sets the target value Vc_aim of the power conversion unit 12c to the same value as the maximum efficiency voltage $Vc\_\eta$ in step S212. The division unit 20 also stores a result of subtracting the value of the maximum efficiency voltage $Vc\_\eta$ of the power conversion unit 12c from the target value Vaim from the outside as an updated value Vaim'.

If the target value Vaim from the outside is less than or equal to the maximum efficiency voltage $Vc\_\eta$ of the power conversion unit 12c in step S211, the division unit 20 sets the target value Vc_aim of the power conversion unit 12c to 0 V in step S213. The division unit 20 also stores the target value Vaim from the outside as the updated value Vaim'.

After step S200, the division unit 20 checks the numerical value of COUNT which is an internal variable with an initial value of 0 in step S201. Specifically, the division unit 20 compares the numerical value of COUNT with predetermined P. The value of P is preset to a value obtained by dividing the length of the period of U1 by a time corresponding to 1 of COUNT. As a specific example, assume that the length of the period of U1 is 5 minutes and COUNT is incremented every minute. In that case, the value of P is set to 5.

Figure 13:
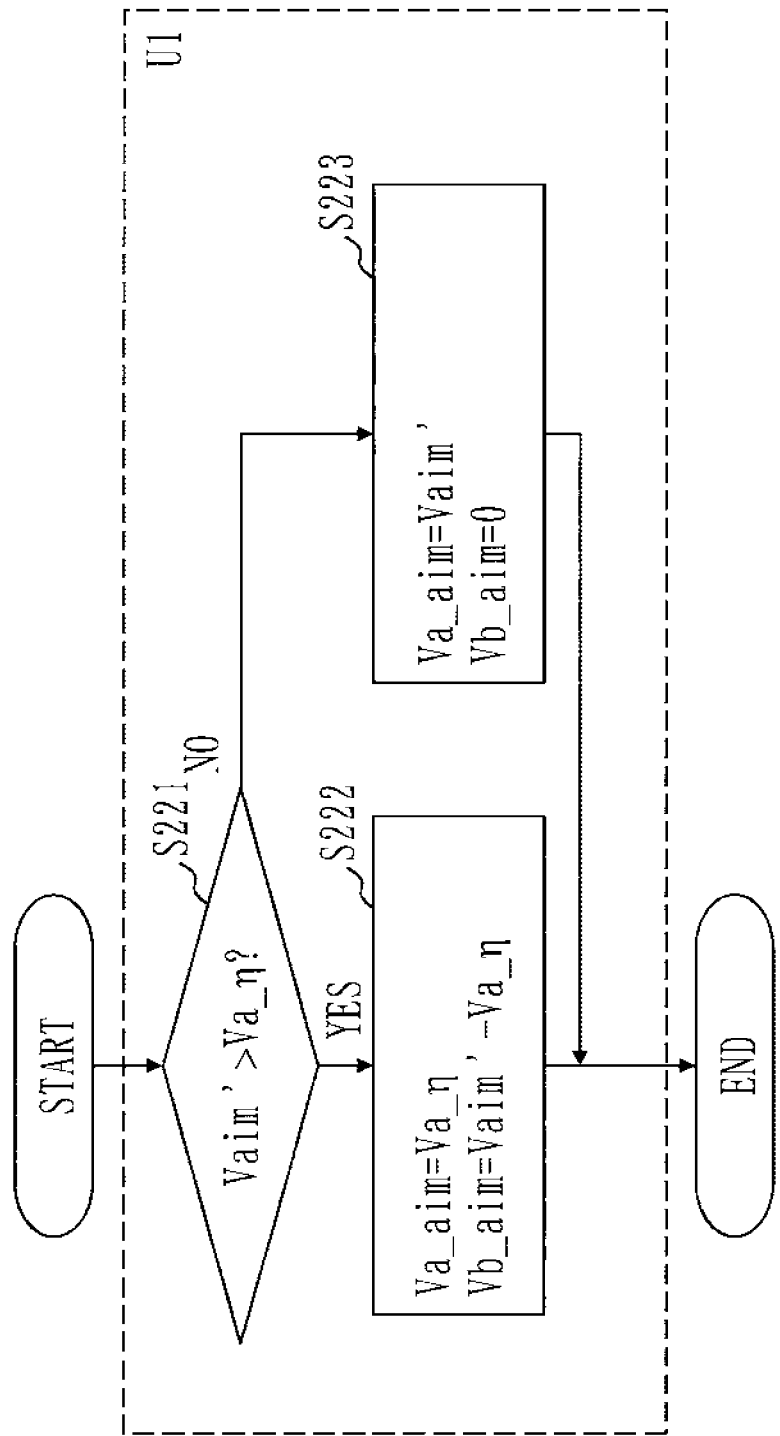
FIG. 13 is a flowchart illustrating the operation of the control unit of the power conversion apparatus according to the second embodiment.

If COUNT is less than or equal to P in step S201, the division unit 20 executes processing for U1 illustrated in FIG. 13 in step S202.

In step S221, the division unit 20 compares the updated value Vaim' with the value of the maximum efficiency voltage Va η of the power conversion unit 12a.

If the updated value Vaim' is larger than the maximum efficiency voltage Va_η of the power conversion unit 12a in step S221, the division unit 20 sets the target value Va_aim of the power conversion unit 12a to the same value as the maximum efficiency voltage Va_η in step S222. The division unit 20 also sets the target value Vb_aim of the power conversion unit 12b to a value obtained by subtracting the value of the maximum efficiency voltage Va_η of the power conversion unit 12a from the updated value Vaim'.

If the updated value Vaim' is less than or equal to the maximum efficiency voltage Va_η of the power conversion unit 12a in step S221, the division unit 20 sets the target value Va_aim of the power conversion unit 12a to the same value as the updated value Vaim' in step S223. The division unit 20 also sets the target value Vb_aim of the power conversion unit 12b to 0 V.

Figure 14:
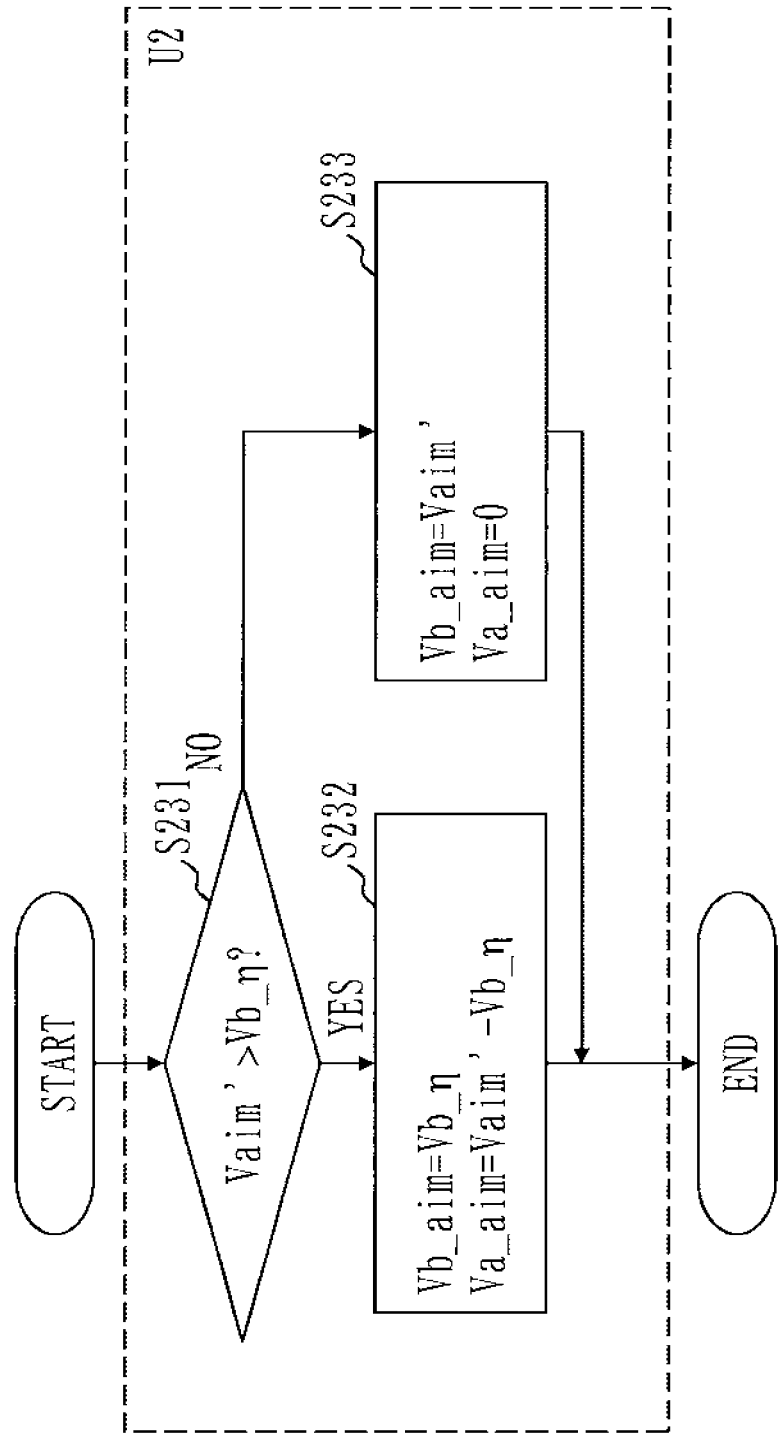
FIG. 14 is a flowchart illustrating the operation of the control unit of the power conversion apparatus according to the second embodiment.

If COUNT is larger than P in step S201, the division unit 20 executes processing for U2 illustrated in FIG. 14 in step S203.

In step S203, the processing executed for the power conversion unit 12a and the processing executed for the power conversion unit 12b in step S202 are executed for the power conversion unit 12b and the power conversion unit 12a, respectively. That is, the processing executed in step S231 to step S233 is the same as the processing executed in step S221 to step S223, respectively, except that "a" is replaced with "b" and "b" is replaced with "a".

After one of step S202 and step S203, the division unit 20 updates COUNT so that the numerical value of COUNT increases by 1 in step S204. That is, the division unit 20 increments COUNT.

After step S204, the division unit 20 checks the numerical value of COUNT in step S205. Specifically, the division unit 20 compares the numerical value of COUNT with predetermined Q. The value of Q is preset to a value obtained by dividing the total length of the periods of U1 and U2 by the time corresponding to 1 of COUNT. As a specific example, assume that the length of each period of U1 and U2 is 5 minutes and COUNT is incremented every minute. In that case, the value of Q is set to 10.

If COUNT is equal to Q in step S205, the division unit 20 resets COUNT to 0 in step S206.

If COUNT is not equal to Q in step S205, or after step S206, the operation of the division unit 20 is terminated once. Then, the operation of the division unit 20 is resumed from step S200.

*Description of Effect of Embodiment*

In this embodiment, when making one or more of the power conversion units 12 output the first voltage which is fixed and making a different one of the power conversion units 12 output the second voltage which is adjusted in accordance with the target value Vaim, the control unit 15 repeatedly switches the power conversion unit 12 to output the second voltage between two of the power conversion units 12. Thus, heat generation can be dispersed. As a result, a hot spot is unlikely to occur in the power conversion apparatus 10.

*Other Configurations*

In this embodiment, all combinations of the direct current voltage source 11, the power conversion unit 12, and the capacitor 13 are implemented with the same circuit configuration and the same circuit components. However, the combinations of the direct current voltage source 11, the power conversion unit 12, and the capacitor 13 may be implemented with respectively different circuit configurations or respectively different circuit components. As a specific example, the power conversion unit 12 never to output the second voltage may be implemented with a circuit configuration or circuit components without the function for adjusting the output voltage. That is, the power conversion unit 12c may be implemented with a circuit configuration or circuit components different from those of the power conversion unit 12a and the power conversion unit 12b.

In this embodiment, the power conversion apparatus 10 includes three of the power conversion units 12. As a modification example, the power conversion apparatus 10 may include four or more of the power conversion units 12. In such an example, when making one or more of the power conversion units 12 output the first voltage which is fixed and making a different one of the power conversion units 12 output the second voltage which is adjusted in accordance with the target value Vaim, the control unit 15 repeatedly switches the power conversion unit 12 to output the second voltage at least between two of the power conversion units 12. Thus, heat generation can be dispersed as in this embodiment.

REFERENCE SIGNS LIST

10: power conversion apparatus, 11: direct current voltage source, 11a: direct current voltage source, 11b: direct current voltage source, 11c: direct current voltage source, 12: power conversion unit, 12a: power conversion unit, 12b: power conversion unit, 12c: power conversion unit, 13: capacitor, 13a: capacitor, 13b: capacitor, 13c: capacitor, 14: load, 15: control unit, 20: division unit, 21: protection unit, 22a: adder, 22b: adder, 22c: adder, 23a: calculation unit, 23b: calculation unit, 23c: calculation unit, 30: electric propulsion system

The invention claimed is:

1. A power conversion apparatus comprising:
a plurality of power conversion units each having a function of converting an input direct current voltage to a different direct current voltage; and
a control unit to control the plurality of power conversion units in accordance with a target value for a sum of voltages output from the plurality of power conversion units, and when making one or more of the plurality of power conversion units output a first voltage which is fixed and making a different one of the plurality of power conversion units output a second voltage which is adjusted in accordance with the target value, to repeatedly switch at least one power conversion unit of the plurality of power conversion units to output the second voltage at least between two of the plurality of power conversion units.

2. The power conversion apparatus according to claim 1, wherein when making one of the plurality of power conversion units output the second voltage and making a rest of the plurality of power conversion units output the first voltage, the control unit switches the at least one power conversion unit to output the second voltage among the plurality of power conversion units in turn.

3. The power conversion apparatus according to claim 1, wherein the control unit switches the at least one power conversion unit to output the second voltage at equal time intervals.

4. The power conversion apparatus according to claim 1, wherein the control unit detects a temperature of the at least one power conversion unit to output the second voltage, and when a detected temperature exceeds a threshold, switches the power conversion unit to output the second voltage.

5. The power conversion apparatus according to claim 1, wherein the control unit repeatedly switches priorities of the plurality of power conversion units, and selects a first power conversion unit from the plurality of power conversion units to output the first voltage in accordance with the priorities, to an extent that a sum of voltages output from the plurality of power conversion units does not exceed the target value, and when a sum of voltages output from selected one or more of the plurality of power conversion units is lower than the target value, the control unit selects a second power conversion unit from the plurality of power conversion units to output a shortfall as the second voltage in accordance with the priorities.

6. The power conversion apparatus according to claim 1, wherein the plurality of power conversion units each have a characteristic that conversion efficiency of each of the plurality of power conversion units is maximized when a voltage output from each of the plurality of power conversion units is the first voltage.

7. The power conversion apparatus according to claim 1, wherein when the sum of voltages output from the plurality of power conversion units exceeds a threshold, the control unit stops output of the plurality of power conversion units individually.

8. The power conversion apparatus according to claim 1, wherein each of the plurality of power conversion units is a switching-type converter with pulse width control.

9. An electric propulsion system comprising:
the power conversion apparatus according to claim 1; and
a load to which voltages output from the plurality of power conversion units are applied.

10. The power conversion apparatus according to claim 2, wherein the control unit switches the at least one power conversion unit to output the second voltage at equal time intervals.

11. The power conversion apparatus according to claim 2, wherein the control unit detects a temperature of the at least one power conversion unit to output the second voltage, and when a detected temperature exceeds a threshold, switches the at least one power conversion unit to output the second voltage.

12. The power conversion apparatus according to claim 2, wherein the control unit repeatedly switches priorities of the plurality of power conversion units, and selects a first power conversion unit from the plurality of power conversion units to output the first voltage in accordance with the priorities, to an extent that a sum of voltages output from the plurality of power conversion units does not exceed the target value, and when a sum of voltages output from selected one or more of the plurality of power conversion units is lower than the target value, the control unit selects a second power conversion unit from the plurality of power conversion units to output a shortfall as the second voltage in accordance with the priorities.

13. The power conversion apparatus according to claim 2, wherein the plurality of power conversion units each have a characteristic that conversion efficiency of each of the plurality of power conversion units is maximized when a voltage output from each of the plurality of power conversion units is the first voltage.

14. The power conversion apparatus according to claim 2, wherein when the sum of voltages output from the plurality of power conversion units exceeds a threshold, the control unit stops output of the plurality of power conversion units individually.

15. The power conversion apparatus according to claim 2, wherein each of the plurality of power conversion units is a switching-type converter with pulse width control.

16. An electric propulsion system comprising:
the power conversion apparatus according to claim 2; and
a load to which voltages output from the plurality of power conversion units are applied.

* * * * *